Jan. 10, 1961 P. J. GOOD 2,967,473
FILM PROCESSING APPARATUS
Filed Jan. 25, 1960 2 Sheets-Sheet 1
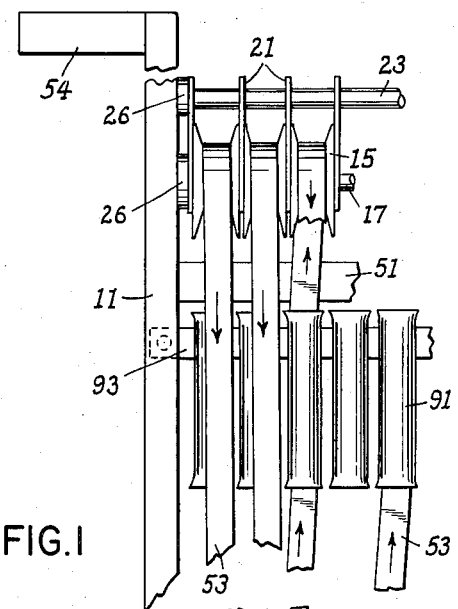
FIG.1
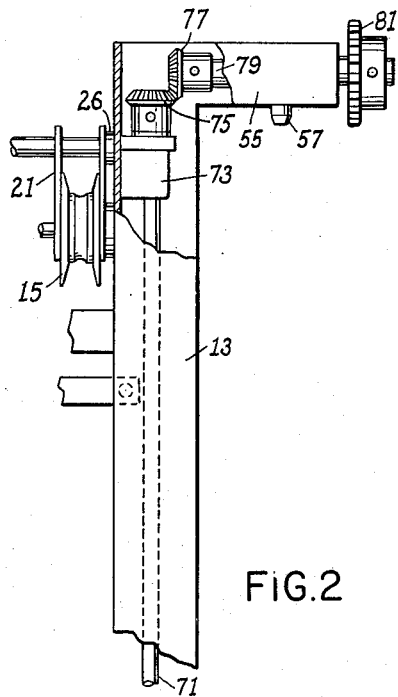
FIG.2
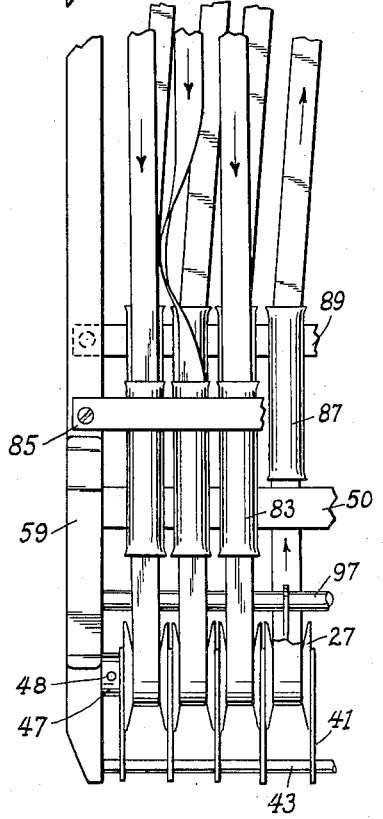
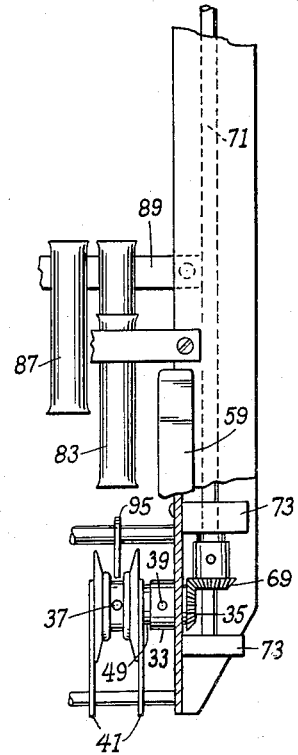

Jan. 10, 1961     P. J. GOOD     2,967,473
FILM PROCESSING APPARATUS

Filed Jan. 25, 1960     2 Sheets-Sheet 2

United States Patent Office 2,967,473
Patented Jan. 10, 1961

2,967,473
FILM PROCESSING APPARATUS

Paul J. Good, Rochester, N.Y., assignor to Dynacolor Corporation, Brockport, N.Y., a corporation of New York Filed Jan. 25, 1960, Ser. No. 4,470
9 Claims. (Cl. 95—94)

The present invention relates to film processing apparatus, particularly racks of the type used to conduct a long length of film through the various baths used in developing film.

An object of the invention is to provide a new and improved rack adapted to be immersed in a photographic bath and having rollers over which the film runs continuously to be processed.

Another object is the provision of improved film processing racks especially designed for use in processing tanks having extremely high agitation rates tending to form loops in the film as it is being run through, with the possibility of the film breaking.

A further object is to provide a new and improved film processing rack designed to more efficiently conduct film through processing tanks having extremely high agitation rates, and to reduce the number of stoppages.

These and other desirable objects may be attained in the manner disclosed as an illustrative embodiment of the invention in the following description and in the accompanying drawings forming a part hereof, in which:

Fig. 1 is a side elevational view, with portions omitted and broken away, of one side of a single film processing rack according to the invention, the arrows indicating the direction of movement of the various film portions;

Fig. 2 is a side elevational view of the other side of the rack shown in Fig. 1, a portion of the rack between Figs. 1 and 2 having been omitted, portions of Fig. 2 also having been omitted and broken away, and the film not being shown in this view;

The same reference numerals throughout the several views indicate the same parts.

Figure 3:
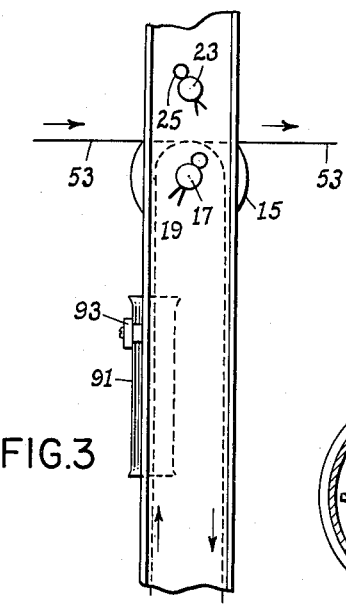
Fig. 3 is an end elevational view looking from the left of Fig. 1, the film being indicated partially in dotted lines.

The single film processing rack shown in Figs. 1 and 2, an indeterminate length of the rack having been omitted between Figs. 1 and 2, comprises a pair of side frame members 11 and 13 desirably provided by two opposing channel members having their bases facing toward one another. A row of upper rollers 15 extends between the upper ends of the side frame members 11 and 13. The rollers 15 are freely rotatable on a cross shaft 17, see Fig. 3, bearing for rotation in apertures in the bases of the channels 11 and 13 and held against lateral displacement by a cotter pin 19 at either end inserted through the shaft 17. In view of their function to be explained later in greater detail, the rollers 15 may also be called idler rollers.

Adjacent pairs of the upper rollers 15 are spaced from one another by a plurality of separator plates 21 each having an aperture through which the cross shaft 17 extends. The separator plates 21 are mounted at their upper ends on a cross rod 23, each plate 21 more particularly having another aperture through which the rod 23 extends. At its ends, the cross rod 23 is received in apertures in the bases of the side channels 11 and 13 and is held against lateral displacement by a cotter pin 25 at either end. The two sidemost separator plates 21 are spaced from the bases of the side channels 11 and 13 by a pair of small rubber collars 26 each received on the shafts 17 and 23 at either side. By this arrangement, it can be seen that the upper rollers 15 are freely rotatable on their shaft 17 and are spaced from one another by the separator plates 21 against which the sides of the rollers may slide freely, with some lateral play or looseness.

At the lower end of the side frame members 11 and 13 is disposed a row of lower rollers 27. The rollers 27 are the same diameter as the upper rollers 15 and are preferably almost identical. The lower rollers 27 are mounted for rotation with a cross shaft 29 which extends at one end, see Fig. 3, through an aperture in the side channel 11 into a Micarta bearing block 31 fastened to the channel 11. At its other end (Fig. 2) the shaft 29 extends into the sleeve 33 of a bevel gear 35 supported for rotation in an aperture in the base of the other side channel 13. As the lower rollers 27 are to be drive rollers, each roller 27 is fixed for rotation with the shaft 29 by a setscrew or lock pin 37, and the shaft 29 is fixed for rotation with the sleeve 33 by a setscrew 39.

The lower rollers 27 are each separated by a plurality of separator plates 41 which may be identical to the previously mentioned separator plates 21 for the upper rollers 15. The separator plates 41 each have a pair of apertures for mounting them on the shaft 29 and also on a lower cross rod 43, the cross rod 43 being mounted on the bases of the side channels 11 and 13 and secured against lateral displacement by a cotter pin 45 at either end. The outer separator plate 41 at one side is spaced from the base of the side channel 11 by a collar 47 which is fixed to the shaft 29 by a roll pin 48. The sidemost separator plate 41 at the other side is spaced from the sleeve 33 by a lock washer 49. A pair of laterally extending braces 50 and 51 also connect the side frame members 11 and 13.

A single continuous length of film 53 is disposed for looping over the upper rollers 15 and the lower rollers 27 in succession from one side to the other, that is, the film 53 rolls over an upper roller 15, downwardly over a lower roller 27, then upwardly over the next upper roller 15, downwardly over the next lower roller 27, and so on until the end roller. By driving the lower rollers 27, which are the drive rollers, in a manner to be presently described, the film 53 traverses the rack entering, as shown in Fig. 3, at one side and leaving at the other. Since it is always desired to have the film 53 enter at an upper roller 15 as shown in Fig. 3, and also leave at an upper roller, there is one more upper roller 15 than there are lower rollers 27. For instance, there are ten upper rollers 15, but only nine lower rollers 27, so that the film 53 enters the rack at one upper roller 15 at one side, and leaves the rack at the other upper roller 15 at the other side.

There is secured to the extreme upper end of the side frame member 11 a laterally extending support and handle 54. Also a rectangular bearing sleeve support block 55 of wood, for instance, is secured between extensions of the upper end of the other side channel 13 extending laterally to the side. To one of the side extensions is fastened a depending pin 57 for locating the assembly of the film processing rack on a processing machine frame or tank having a corresponding locating hole, The processing tanks are not shown in the drawing, but it will be readily understood that the film processing rack of the invention is adapted to be suspended in such a tank with the supporting members 54 and 55 resting on the top members of the tank. The processing tank is filled with a photographic bath liquid or with water, such as liquids suitable for developing, fixing, short stopping, or washing the film as it is run through a developing process. More than one of the film processing racks may be used in a single tank, the number of racks being used determining the length of time which the film to be processed spends in a tank. The pins 57 of the support block 55 of a plurality of racks may be inserted in a plurality of locating holes in the top member of the developing tank or processing machine frame to space each rack from the next rack by an appropriate distance. In order to properly space adjacent racks one from another, there are secured to the opposite outer surfaces of the sidewardly extending legs of the side channel 11, see Fig. 3, a pair of spacer bars 59 and 61. Similarly located spacer bars are secured to the legs of the other side channel 13.

It may be seen that where a plurality of film processing racks are used in a single developing tank, the film 53 enters the first rack at the sidemost upper roller 15, and leaves the first rack at the other sidemost upper roller 15, to proceed to the next film processing rack which it likewise enters at an upper roller 15. The length of time which the film 53 spends in any particular developing tank depends upon the number of racks used and the speed at which the lower drive rollers 27 are driven. The film may proceed from one developing tank to the next without stopping, the time to be spent in each tank depending upon the number of processing racks used.

In order to rotate the lower drive rollers 27, it has been explained that the rollers 27 are fixed for rotation with the shaft 29, and that the shaft 29 in turn is fixed for rotation with the sleeve 33 of the bevel gear 35. The bevel gear 35 meshes with another bevel gear 69 having an integral sleeve fixed for rotation with a vertically disposed shaft 71. The shaft 71 is supported for rotation in a plurality of bearing blocks 73 supported on the base of the side channel 13.

At its upper end, there is fixed to the shaft 71 another bevel gear 75 which is in meshing engagement with yet another bevel gear 77. The bevel gear 77 is disposed adjacent to the laterally extending bearing sleeve support block 55 and is fixed for rotation with a shaft 79 journaled in a bearing sleeve in the block 55. The other end of the shaft 79 extends out of the block 55 and is secured to a sprocket gear 81. Although not here shown, the sprocket gear 81 is adapted to be driven by a sprocket chain, whereby the meshing bevel gears 77 and 75 are rotated, thus rotating the shaft 71 and the bevel gears 69 and 35 at the other end. Since the shaft 29 is rotated by the bevel gear 35, it follows that the drive rollers 27 are rotated by a like amount. A single sprocket chain meshing with the sprocket gears 81 of a plurality of film processing racks assembled on a single developing tank may be used for operating all of the racks.

The drive for the lower rollers 27 which has been described is commonly called a "bottom drive" machine. The disadvantage of a pure bottom drive machine is that the bottom roller has to be over driven a small percentage in order to properly move the web through the machine, and there is a tendency for extra lengths of film to accumulate at various points throughout the machine, especially if the solutions are highly agitated or recirculated as is necessary, for instance, in the Kodachrome process. Normally, each bottom roller serves as a driving clutch in its contact with the film web. If the web tension is too high in a particular loop in the rack, it will engage the driving rollers previous to that loop more securely and more web will be fed into the tight loop. If a given loop gets too loose, it will fall away from the bottom roller and, in this way, be declutched from the drive and will then immediately drive again when the tension comes back to normal. When the solutions are rapidly recirculated and there is a heavy agitation in the first processing tank, liquid pressures on certain of the film webs induce false tensions in the loops and cause extra amounts of film to be fed into certain loops which are particularly heavily agitated. As these extra loops of film feed into the racks, they fall behind the web in the previous loop of the rack and cause a condition in which the extra loop which has fallen down behind the previous loop eventually winds around the other bottom roller and causes a break in the film.

Figure 4:
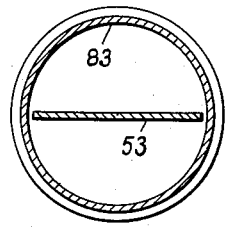
Fig. 4 is a cross-sectional view through one of the film guide tubes shown in Fig. 3.

The feeding of the film 53 through the film processing rack with a lessening of breakages and the formation of extra loops is facilitated in accordance with the present invention. To this end, a row of vertically extending guide tubes 83 are disposed above the lower rollers 27 in position so that the film 53 passes first through a tube 83 and then over a lower roller 27 disposed immediately below it. There is one tube 83 provided for each drive roller 27, each being welded or otherwise suitably fastened to a crossbar 85 secured at either end to the side channels 11 and 13. As can be seen in Fig. 4, each tube 83 is preferably circular in cross section and has a diameter slightly greater than the width of the film 53, which may be 16 mm. film. The tubes 83 are desirably flanged outwardly at their upper and lower ends to prevent catching of the film 53 as it slides past. The tubes 83 are located on assembly so that the film may pass through without touching the inside of the tubes, when the film is reasonably taut and straight. But if any looseness develops in the film, its edges will drag somewhat against the inner surface of the tube, which is not objectionable but actually is desirable for the reasons pointed out below.

In similar fashion, a row of guide tubes 87 are welded to a crossbar 89 fastened at its ends to the other legs of the side channels 11 and 13. The film 53 passes through the tubes 87 after rolling over the lower rollers 27 on their way up to the next upper roller 15. Although it is not absolutely necessary, the tubes 87 are preferably at a higher level from the previously mentioned tubes 83.

There is still another row of guide tubes 91, which may be identical to the tubes 83 and 87, this row of tubes 91 being disposed just below the upper idler rollers 15. The row of tubes 91 is preferably vertically above the previously mentioned row of tubes 87, so that the film 53 passes through the tubes 91 as the film proceeds from a bottom roller to a next succeeding upper roller. The tubes 91 are welded or otherwise appropriately fastened to a crossbar 93 extending between the side channels 11 and 13. Since a tube 91 is provided for each respective upper roller 15, it follows that there is one more tube 91 than there are tubes 83 and 87.

The guide tubes 83, 87, and 91 accomplish at least two purposes. First, they tend to prevent any extra film from feeding into the machine because the moment the film starts to balloon out of its normal straight course, a large amount of friction is generated in the entrance of the loop to the guide tube and restrains the loop from pulling more film into the rack until the excess has been fed through the rack by the bottom roller. Secondly, any loose loop that does form is prevented from tangling with other webs in the rack because it forms outside of the rack above the tubes where it is not dangerous. Note that the formation of a loop above one of the tubes 83 is illustrated in Fig. 1. The tubes thus serve as a good web control and allow the simple bottom drive system for driving the lower rollers 27 to be used in processing tanks having extremely high agitation rates with no possibility of the film breaking.

Another device to assure the smooth running of the film through the rack is provided by a finger or stripper 95, see Figs. 1 and 2, for each of the lower drive rollers 27. The fingers 95 are mounted on a cross rod 97 extending between the side channels 11 and 13 above the row of lower rollers 27. The fingers 95 are fixed to the cross rod 97, and a constant rotational position of the cross rod 97 is assured, see Fig. 3, by a cotter pin 99 inserted into the end of the cross rod and secured as to angular position by a screw fastener 101.

Figure 5:
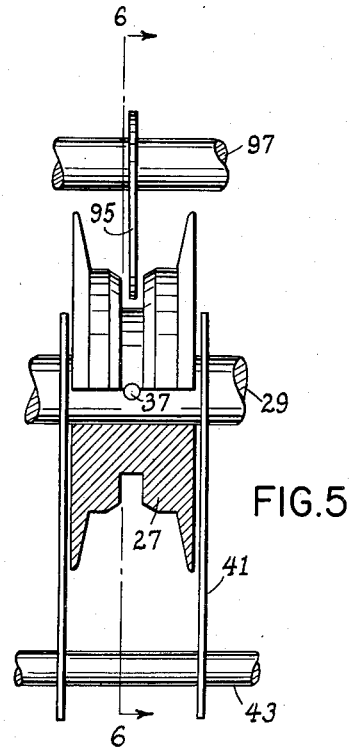
Fig. 5 is a side elevational view to an enlarged scale and partly in section of one of the rollers and various cooperating parts shown in Fig. 2.
Figure 6:
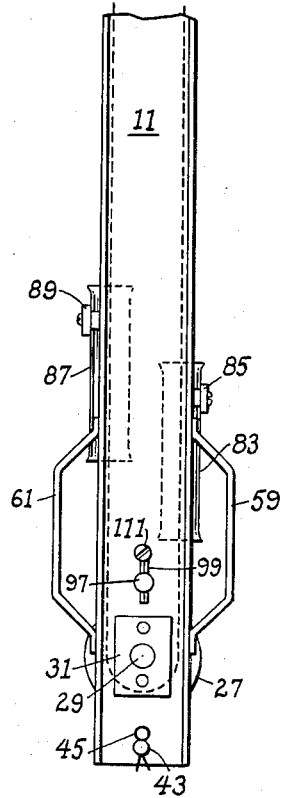
Fig. 6 is a cross-sectional view of the mechanism shown in Fig. 5 taken on the line 6—6 thereof.
Figure 6:
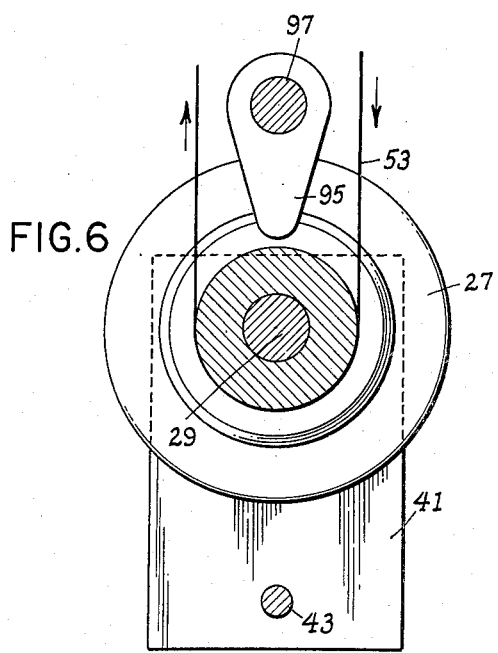

The fingers or strippers 95 are desirably tapered downwardly, see Fig. 6, and extend into the central depression of the roller 27 as best seen in Fig. 5. As the film 53 rolls around the roller 27, there is sometimes a tendency for the film to stick to the roller and to be carried around with it. The finger 95 strips the film off of the roller and deflects it outwardly back to its normal position.

The operation of the film processing rack will be briefly reviewed. The film 53 is fed into the rack, entering over the first of the upper rollers 15, extending downwardly through a tube 83, around the first of the lower rollers 27, up through a tube 87, then through a tube 91, and over the next upper roller 15. The film 53 is conducted over the various rollers and through the various tubes in like manner until coming off of the rack at the last of the upper rollers 15. It will be recalled that there is preferably one more upper roller 15 than there are lower rollers 27, so that the film 53 enters at an upper roller and also leaves at an upper roller. The rack is inserted into a processing tank, not here shown, with the supporting members 54 and 55 resting upon the top members of the tank or machine frame and the pin 57 inserted in one of the locating holes of the top member of the processing tank or machine frame. Where a succession of racks are used in a single tank, the pins 57 serve to space the racks appropriately, and adjacent racks are maintained in proper spacing one with another by the spacer bars 59 and 61 (Fig. 3).

The drive for the machine is produced by the sprocket gear 81 engaging with a sprocket chain, not here shown. As the sprocket gear 81 is rotated, the bevel gear arrangement rotates the vertical shaft 71 by a like amount, and also the shaft 29 for the lower rollers 27 which is fixed for rotation with the final bevel gear 35. The row of lower rollers 27 fixed to the shaft 29 thus rotate in response to driving the sprocket gear 81.

The bottom rollers 27 are over-driven by a small percentage in order to properly move the film 53 through the machine, and there is a tendency for extra lengths of film to accumulate at various points throughout the machine, especially when the solutions are highly agitated or recirculated. When the solutions are rapidly recirculated and there is a heavy agitation in the processing tank, liquid pressures on certain of the film webs induce false tensions in the loops and cause extra amounts of film to be fed into certain loops which are particularly heavily agitated, as illustrated in Fig. 1. The tubes 83, 87, and 91 tend to prevent any extra loop from feeding into the machine because the moment the film starts to balloon out of its normal straight course, a large amount of friction is generated in the entrance of the loop to the guide tubes and additional film is restrained from feeding into the rack until the excess film is fed out by the next bottom roller. Furthermore, any loose loop that does form is prevented from tangling with other webs in the rack because it forms outside of the rack above the tubes where it is not dangerous. The tubes provide a perfect web control with no possibilities of the film breaking in highly agitated tanks. The tendency of the film 53 to stick to the lower rollers 27 and to continue on going around with the roller is prevented by the stripper fingers 95 which intercept the stuck film and urge it back out to its normal course.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:
1. A film processing rack for insertion into an agitated solution, said rack comprising a pair of opposing side frame members, a row of upper rollers and a row of lower rollers each extending between said side frame members, said rollers being adapted to receive a single continuous length of film looped over one of said upper rollers to one of said lower rollers and back up to the next of said upper rollers proceeding in order from one side to the other, means for rotating said lower rollers, and a plurality of rows of guide tubes each extending between said side frame members just below said upper rollers and just above said lower rollers, there being one guide tube for each roller in said respective rows, said film being adapted to pass through said guide tubes to lessen the tendency to break by forming extra loops.

2. A construction as defined in claim 1, wherein there are three rows of said guide tubes, two of said rows being above said row of lower rollers to be adapted to receive the film as it rolls onto and off of said lower rollers.

3. A construction as defined in claim 2, wherein said two rows of guide tubes above said lower rollers are at different levels.

4. A film processing rack for insertion into a highly agitated and recirculated solution, said rack comprising a pair of opposing side frame members, a row of upper idler rollers and a parallel row of lower drive rollers each extending between said side frame members, said rollers being adapted to receive a single continuous length of film looped over a first one of said upper rollers to a first one of said lower rollers and back up to the next of said upper rollers proceeding in order from one side to the other, there being one more of said upper rollers than said lower rollers so that the film enters and leaves the rack at said upper rollers, means for driving said lower rollers, two rows of guide tubes extending between said side frame members just above said row of lower rollers, there being one guide tube for each of said lower rollers, the film being adapted to pass through said guide tubes as it rolls onto and off of said lower rollers, and at least one row of other guide tubes extending between said side frame members just below said row of upper rollers, there being one of said other guide tubes for each of said upper rollers, the film being adapted to pass through said other guide tubes before rolling over said upper rollers.

5. A construction as defined in claim 4, wherein said lower rollers each has an annular depression, and a plurality of stripper fingers supported from said side frame members and each extending downwardly into one of said annular depressions in said lower rollers to strip off the film from the lower rollers as it becomes stuck thereto while rolling past.

6. A film processing rack for insertion into a highly agitated and recirculated solution, said rack comprising a pair of opposing side frame members, a row of upper idler rollers and a parallel row of lower drive rollers extending between said side frame members, said rollers being adapted to receive a single continuous length of film looped over one of said upper rollers to one of said lower rollers and back up to the next of said upper rollers proceeding in order from one side to the other, and means for rotating said lower rollers, characterized by the provision of a plurality of guide tubes mounted between said rows of upper and lower rollers and adjacent thereto, each of said guide tubes being in alinement with the film near its respective roller, the film passing through said guide tubes and said guide tubes serving to lessen the tendency of the film to break by forming extra loops.

7. A construction as defined in claim 6, wherein there are at least three rows of said guide tubes, two of said rows of guide tubes being adjacent said row of lower rollers to be adapted to receive the film as it rolls onto and off of said lower rollers, and at least one row of said guide tubes being adjacent said row of upper rollers.

8. A construction as defined in claim 6, wherein each of said lower rollers has a central annular depression, and a row of stripper fingers supported on said side frame members, each of said stripper fingers being tapered downwardly and extending into said annular depression in one of said lower rollers to strip off the film as it becomes stuck thereto.

9. A film processing rack for insertion into a highly agitated and recirculated solution, said rack comprising a pair of opposing side frame members, a row of upper idler rollers and a parallel row of lower drive rollers each extending between said side frame members, said rollers being adapted to receive a single continuous length of film looped over a first one of said upper rollers to a first one of said lower rollers and back up to the next of said upper rollers proceeding in order from one side to the other, there being one more of said upper rollers than said lower rollers so that the film enters and leaves the rack at said upper rollers, means for driving said lower rollers, and a row of guide tubes adjacent one row of rollers positioned so that the respective loops of film pass through the respective tubes of said row of tubes in close proximity to the passage of said loops of film over the rollers of said one row of rollers.

References Cited in the file of this patent

UNITED STATES PATENTS

| | | |
|---|---|---|
| 2,123,445 | Van Leuven | July 12, 1938 |
| 2,511,941 | Pratt et al. | June 20, 1950 |
| 2,618,142 | Belcher et al. | Nov. 18, 1952 |